No. 656,490. Patented Aug. 21, 1900.
C. E. THURLOW.
TINE SPREADER.
(Application filed Jan. 2, 1900.)
(No Model.)
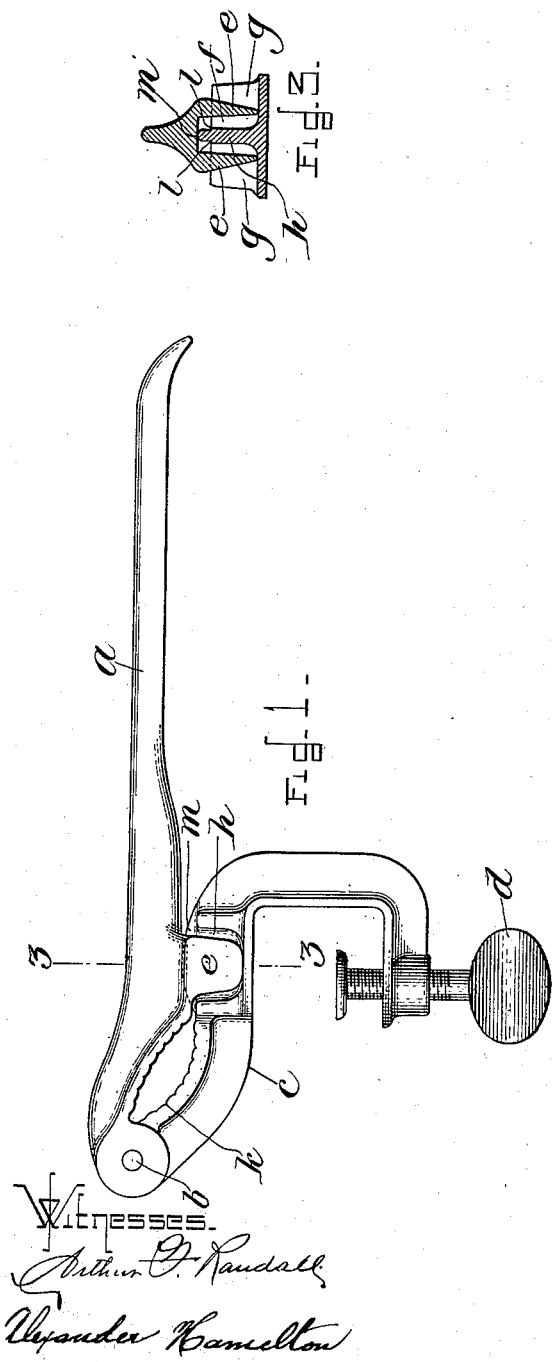
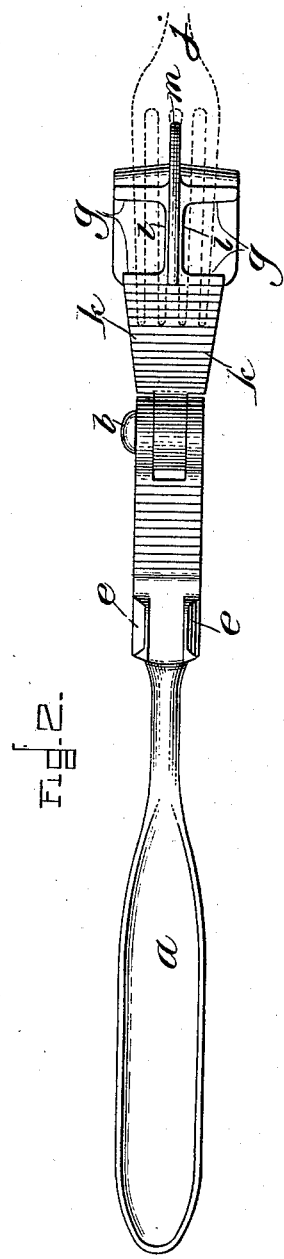
Witnesses.
Arthur F. Randall
Alexander Hamilton
Inventor:
Clarence E. Thurlow
by Elliott & Hamilton
his attorneys

UNITED STATES PATENT OFFICE.

CLARENCE E. THURLOW, OF BROOKLINE, MASSACHUSETTS.

TINE-SPREADER.

SPECIFICATION forming part of Letters Patent No. 656,490, dated August 21, 1900.

Application filed January 2, 1900. Serial No. 40. (No model.)

*To all whom it may concern:*

Be it known that I, CLARENCE E. THURLOW, of Brookline, in the county of Norfolk and State of Massachusetts, have invented a new and useful Improvement in Tine-Spreaders, of which the following is a specification, reference being had to the accompanying drawings, in which—

Figure 1 is a side elevation of my new tine-spreader closed. Fig. 2 is a plan view of my new tine-spreader open. Fig. 3 is a section on line 3 3, Fig. 1.

In the drawings illustrating the principle of my invention and the best mode now known to me of applying that principle, $a$ is a lever fulcrumed at $b$. The base $c$ is secured to any suitable support by means of the screw-clamp $d$. Integral with the lever $a$ are the two wedge-shaped lugs $e$ $e$, which form the walls of a recess $f$. In the upper portion of the base $c$ are formed two recesses $g$ $g$, separated longitudinally by a partition-wall $h$. The forward and rear walls of the recesses $g$ $g$ and the shoulders $l$ $l$ of the partition-wall $h$ serve as supports for the fork during the spreading operation. The upper portion $m$ of the partition-wall $h$ projects above the rear and front walls of the recesses $g$ $g$, and this projecting portion enters between the middle tines of the fork $j$, as shown in dotted lines in Fig. 2. When the lever is brought down, the wedge-shaped lugs $e$ $e$ enter between the outer tines and spread them apart to the desired extent. The ends of the tines engage in the corrugations $k$ $k$ in the upper surface of the base $c$ and are supported thereby, and when the lever is brought down the tines are straightened longitudinally, if bent. The under surface of the rear portion of the lever $a$ is curved and corrugated, as shown, and this permits the tine-spreader to be used as a nut-cracker.

It is evident that variations may be made from the above-described preferred form without departing from the spirit of my invention. For instance, the lever may be provided with as many lugs as there are spaces between the tines. In this case the projecting portion $m$ would be dispensed with and the middle lug would spread and hold apart the middle tines against the wedging action of the outer lugs.

What I claim is—

1. A tine-spreader made up of a lever provided with lugs adapted to enter between and wedge apart the tines of a fork or like instrument; and a base member for supporting the fork; said base member being provided with a projecting portion for holding the tines apart during the wedging action of the lugs.

2. A tine-spreader made up of a lever provided with lugs adapted to enter between and wedge apart the tines of a fork or like instrument; and a base member for supporting the fork; said base member being provided with corrugations for engaging and supporting the ends of the tines during the longitudinal straightening of said tines; and with a projecting portion for holding the tines apart during the wedging action of the lugs.

3. A tine-spreader made up of a lever provided with lugs adapted to enter between and wedge apart the tines of a fork or like instrument; a base member for supporting the fork; said base member being provided with a projecting portion for holding the tines apart during the wedging action of the spreaders; and means for securing the tine-spreader to a suitable support.

4. The herein-described combined tine-spreader and nut-cracker made up of a lever provided with lugs adapted to enter between and wedge apart the tines of a fork or like instrument; and a base member for supporting the fork; said base member being provided with corrugations for engaging and supporting the ends of the tines during the longitudinal straightening of said tines; and with a projecting portion for holding the tines apart during the wedging action of the lugs; the said lever being curved to form a nut-cracker as shown and described.

5. The herein-described combined tine-spreader and nut-cracker made up of a lever provided with lugs adapted to enter between and wedge apart the tines of a fork or like instrument; a base member for supporting the fork; said base member being provided with corrugations for engaging and supporting the ends of the tines during the longitudinal straightening of said tines; and with a projecting portion for holding the tines apart during the wedging action of the lugs; the said lever being curved to form a nut-cracker as shown and described; and means for securing the tine-spreader to a suitable support.

6. A tine-spreader made up of a supporting base member and a movable member secured thereto provided with lugs which engage between the tines of a fork or like instrument and spread apart the tines.

In testimony whereof I have hereunto set my hand this 28th day of December, 1899.

CLARENCE E. THURLOW.

Witnesses:
H. M. KELSO,
JAMES HAMILTON.